(12) United States Patent
Roimela et al.

(10) Patent No.: US 7,873,212 B2
(45) Date of Patent: Jan. 18, 2011

(54) COMPRESSION OF IMAGES FOR COMPUTER GRAPHICS

(75) Inventors: Kimmo Roimela, Tampere (FI); Tomi Aarnio, Tampere (FI); Joonas Itäranta, Tampere (FI)

(73) Assignee: Nokia Corporation, Espoo (FI)

( * ) Notice: Subject to any disclaimer, the term of this patent is extended or adjusted under 35 U.S.C. 154(b) by 1308 days.

(21) Appl. No.: 11/339,341

(22) Filed: Jan. 24, 2006

(65) Prior Publication Data

US 2007/0172120 A1 Jul. 26, 2007

(51) Int. Cl.
*G06K 9/36* (2006.01)
(52) U.S. Cl. .................................. 382/166
(58) Field of Classification Search ............ 382/166
See application file for complete search history.

(56) References Cited

U.S. PATENT DOCUMENTS

| | | | |
|---|---|---|---|
| 4,887,151 A | 12/1989 | Wataya | |
| 6,002,794 A * | 12/1999 | Bonneau et al. | 382/166 |
| 6,058,217 A * | 5/2000 | Kondo | 382/251 |
| 6,658,146 B1 | 12/2003 | Iourcha et al. | |
| 7,071,947 B1 * | 7/2006 | Papakipos et al. | 345/581 |
| 2002/0048389 A1 * | 4/2002 | Komaki | 382/107 |
| 2003/0053706 A1 | 3/2003 | Hong et al. | |
| 2003/0147470 A1 * | 8/2003 | Lee et al. | 375/245 |
| 2005/0180340 A1 * | 8/2005 | Lee | 370/258 |
| 2006/0077408 A1 * | 4/2006 | Amirghodsi | 358/1.9 |
| 2006/0153476 A1 * | 7/2006 | Munsil et al. | 382/299 |

FOREIGN PATENT DOCUMENTS

| | | |
|---|---|---|
| EP | 1248472 | 10/2002 |
| JP | 01-095672 | 4/1989 |
| JP | 4-291020 | 10/1992 |
| JP | 2861381 | 2/1999 |
| WO | 2005/059836 | 6/2005 |

OTHER PUBLICATIONS

Ruifeng Xu, S. N. Pattanaik,and Charles E. Hughes,"High Dynamic Range Image and Video Data Compression", Technical Report, School of Engineering and Computer Science, University of Central Florida, CS-TR-05-13, 2005.*
Ruifeng Xu, S. N. Pattanaik,and Charles E. Hughes,"High Dynamic Range Image and Video Data Compression", Technical Report, School of Engineering and Computer Science, University of Central Florida, CS-TR-05-13, 2005.*
James D. Murray, William vanRyper, "Encyclopedia of Graphics File Formats, Second Edition," O'Reilly & Associates, Apr. 1996.*

(Continued)

*Primary Examiner*—John B Strege
*Assistant Examiner*—Nirav G Patel

(57) ABSTRACT

A method for encoding an image having color components of each image pixel represented by a value of a high dynamic range, the method comprising: decomposing the image into a plurality of image blocks; separating, from the high dynamic range value of each pixel, color information and intensity information of the pixels in said image blocks; and compressing the color information of the pixels in said image blocks and the intensity information of the pixels in said image blocks independently of each other to provide compressed image data.

24 Claims, 2 Drawing Sheets

OTHER PUBLICATIONS

"Subband Encoding of High Dynamic Range Imagery" by Greg Ward et al, Proc. 1st Symp. Applied Perception in Graphics and Visualization (APGV 04), ACM Press, 2004, pp. 83-90.

"High-Dynamic-Range Still-Image Encoding in JPEG 2000" by Ruifeng Xu et al, IEEE Computer Graphics and Applications, vol. 25, Issue 6, Nov./Dec. 2005, pp. 57-64.

"High Dynamic Range Texture Compression" by Kimmo Roimela et al, ACM Transactions on Graphics (SIGGRAPH '06), vol. 25, Issue 3, Jul. 2006, pp. 707-712.

"High Dynamic Range Texture Compression for Graphics Hardware" by Jacob Munkberg, ACM Transactions on Graphics (SIGGRAPH '06), vol. 25, Issue 3, Jul. 2006, pp. 698-706.

Japanese Office Action mailed Oct. 25, 2010 in corresponding Japanese Patent Application No. 2008-550793, English translation only (12 pages).

Japanese Publication No. 2861381, published Feb. 24, 1999, Sony Corp., English language machine translation (12 pages).

Patent Abstracts of Japan, Japanese Publication No. 04-291020, published Oct. 15, 1992, Sony Corp (1 page).

Patent Abstracts of Japan, Japanese Publication No. 01-095672, published Apr. 13, 1989, Sony Corp. (1 page).

* cited by examiner

COMPRESSION OF IMAGES FOR COMPUTER GRAPHICS

BACKGROUND OF THE INVENTION

The present invention relates to computer graphics, and more particularly to compression of textures and other similar images used typically in three-dimensional computer graphics.

A commonly used technique in rendering a three-dimensional (3D) scene to have a more realistic look is to apply textures on the surfaces of 3D objects. A texture can be defined as an ordinary two-dimensional image, such as a photograph, that is stored in a memory as an array of pixels (or texels, to separate them from screen pixels). Along with the increase in the quality of displays and display drivers as well as in the processing power of graphics accelerators used in computers, the demand for even better image quality in computer graphics also continues. As a general rule, the more memory space and bandwidth can be spent on textures, the better the image quality can be achieved in the final 3D scene.

A traditional way of representing textures is to store the color of each pixel as a combination of three primary colors: red, green and blue (RGB). Typically 8 bits are allocated for each component, yielding 24 bits per pixel (24 bpp). This is called the RGB8 format. Other popular formats include RGB4 and RGB565 that sacrifice color gamut in favor of using less memory space. A problem with the traditional formats of representing colors is that they provide a rather limited dynamic range for colors, for example in comparison to a human's capability of simultaneously perceiving luminance across over 4 dB (i.e. a contrast ratio of $1:10^4=1:10\,000$). Accordingly, textures created with these traditional methods are generally called low dynamic range (LDR) textures. The de facto standard in the field of LDR textures is DXTC (DirectX Texture Compression), also known as S3TC, which is further described in U.S. Pat. No. 6,658,146. Other similar methods include FXT, FLXTC, and ETC (Ericsson Texture Compression), the last one being disclosed also in WO05/059836.

In order to meet the demand for better image quality in computer graphics, image formats that are able to represent the entire dynamic range of luminance in the real world have been developed. These image formats are called high dynamic range (HDR) formats. The emerging de facto standard for storing and manipulating high dynamic range images is OpenEXR, which uses a 16-bit or a 32-bit floating-point representation for the color components. The dynamic range of OpenEXR is more than 11 dB when using the 16-bit variant and up to 76 dB when using the 32-bit variant. The 16-bit format is sufficient for most purposes, yielding a practical bit rate of 48 bpp.

A problem with the HDR textures is that they consume double the amount of memory and bus bandwidth compared to traditional LDR formats. Furthermore, very effective compressed formats exist for LDR textures that can bring the bit rate down to one sixth of the original. Thus, the difference between HDR and LDR textures, in terms of memory and bus bandwidth consumption, is a factor of 12 or more.

The OpenEXR standard supports several compression methods, like PIZ, ZIP, RLE and PXR24, but they all involve a technical shortcoming that none of them allow random access to the compressed data, which is absolutely crucial in mapping textures onto 3D objects. The graphics hardware needs to be able to decompress any given pixel in the image without having to decompress the entire image. Also the decompression must be very fast, since contemporary hardware can fetch and decompress billions of LDR texels per second, and any proposed HDR texture compression scheme should achieve performance that is at least close enough to that.

Ordinary image compression techniques applicable to HDR images as well, such as JPEG and PNG, are similar to the OpenEXR formats in that random access to individual pixels is not possible. In order to access a single pixel e.g. in a JPEG image, the entire image up to that pixel must be decompressed. This is obviously too slow, because millions or even billions of texels must be accessed per second in contemporary computer graphics, like in 3D games.

Accordingly, the conventional image compression techniques are useful in reducing the size of textures for permanent storage and transmission over a network, but they are poorly applicable for reducing the run-time memory space and bandwidth consumption in a decompressor.

The applicant's previous patent application U.S. Ser. No. 11/241,854 describes an image compression method, in which HDR texture image are appropriately scaled such that the image data can be compressed and decompressed according to known LDR techniques. However, in certain cases the scaling introduces too much inaccuracy into the image data. Thus, there is a need for a more accurate image compression method.

SUMMARY OF THE INVENTION

Now there is invented an improved method and technical equipment implementing the method, by which an efficient compression is achieved for HDR textures, while simultaneously allowing run-time per-pixel decompression more accurately in a hardware. Various aspects of the invention include an encoding and a decoding method, an encoder, a decoder, an encoding system, an encoding/decoding apparatus and computer programs for performing the encoding and the decoding, which aspects are characterized by what is stated in the independent claims. Various embodiments of the invention are disclosed in the dependent claims.

According to a first aspect, a method according to the invention is based on the idea of encoding an image having color components of each image pixel represented by a value of a high dynamic range such that the image is first decomposed into a plurality of image blocks; from the high dynamic range value of each pixel, color information and intensity information of the pixels in said image blocks are separated; and the color information of the pixels in said image blocks and the intensity information of the pixels in said image blocks are compressed independently of each other to provide compressed image data.

According to an embodiment, the intensity information of the pixels is compressed separately for each pixel in said image blocks.

According to an embodiment, a minimum intensity within the whole image block is identified, and a floating-point exponent of the minimum intensity is stored in a table of compressed block data as a bias value.

According to an embodiment, the method further comprises: subtracting the bias value from the exponents of all intensity values within the image block to provide biased intensity values for each pixel; and storing the number of leading zero bits of the floating-point bit pattern of the largest biased intensity value in the table of compressed block data, whereby a sign bit is ignored from the number of leading zero bits.

According to an embodiment, the method further comprises: removing from leading zero bits of the floating-point bit patterns of the biased intensity values of each pixel the number of leading zero bits of the floating-point bit pattern of the largest biased intensity value; and storing a fixed number of leading bits from the resulting floating-point bit patterns of the biased intensity values of each pixel in the table of compressed block data.

According to an embodiment, the method further comprises: dividing the image data in said image blocks into sub-blocks; and averaging the color information of the pixels in said sub-blocks such that each pixel in said sub-block is determined to have the same averaged color value.

According to an embodiment, the averaged color information is normalized by dividing it with the sum of its color components, whereby one of the normalized color components can be left out of the compression process.

According to an embodiment, the remaining color components are encoded as 7-bit fixed point numbers.

According to an embodiment, the size of the image block is 4×4 pixels, and the size of the sub-block is 2×2 pixels.

The encoding method according to the invention provides significant advantages. A major advantage is that significant memory savings, in view of both storage capacity and the required bus bandwidth, are achieved in handling of the HDR textures. For example, a non-compressed HDR texture using the 16-bit OpenEXR image format has the practical bit rate of 48 bpp. The above-described procedure allows converting the bit rate into 8 bpp, yielding the memory savings of nearly 85% compared to the 16-bit OpenEXR non-compressed HDR textures. A further advantage is that the image quality of normal images, when decoded, degrades very little or even not at all. A yet further advantage is that embodiments can be implemented with only minor modifications to the existing hardware implementation.

According to a second aspect, there is provided a method for decoding an image from encoded image data, the method comprising: decomposing the encoded image data into a plurality of encoded image blocks; decoding an averaged color information of pixels in a sub-block of said image blocks; decoding intensity information of the pixels in said image blocks; modulating the intensity information of each pixel with the averaged color information of the corresponding pixel; and composing the decoded image blocks into an image with the original dynamic range.

According to an embodiment, the original dynamic range values of the color components of the pixels are represented with 16-bit or 32-bit floating point arithmetic.

According to an embodiment, the step of decoding intensity information of the pixels in said image blocks further comprises: decoding a fixed number of intensity value bits for each pixel; decoding a number of leading zero bits to be included in the intensity value bits for each pixel; and decoding a bias value, which is added to the intensity value bits for each pixel.

According to an embodiment, for decoding any pixel of the encoded image data, the method further comprises: identifying at least one pixel to be decoded; determining, after decomposing the encoded image data into the image blocks, an address of the at least one image block including the at least one pixel to be decoded; retrieving only the at least one image block including the at least one pixel for decoding; and decoding the image data of said at least one image block to output decoded image data of said at least one pixel.

The advantages provided by the decoding method according to the invention are apparent to a skilled man. The texturing hardware of the graphics subsystem advantageously interprets the decoded image data as if it had been read from a floating-point texture directly. The dynamic range, and consequently the image quality provided by the decoding method according to the invention are much better than in traditional LDR formats. Furthermore, the random access property according to an embodiment enables any pixels of any image block to be accessed randomly, whereby only needed sections of an image can beneficially be selected for decoding.

The further aspects of the invention include various apparatuses arranged to carry out the inventive steps of the above methods.

BRIEF DESCRIPTION OF THE SEVERAL VIEWS OF THE DRAWING

In the following, various embodiments of the invention will be described in more detail with reference to the appended drawings, in which.

DETAILED DESCRIPTION OF THE INVENTION

Figure 1:
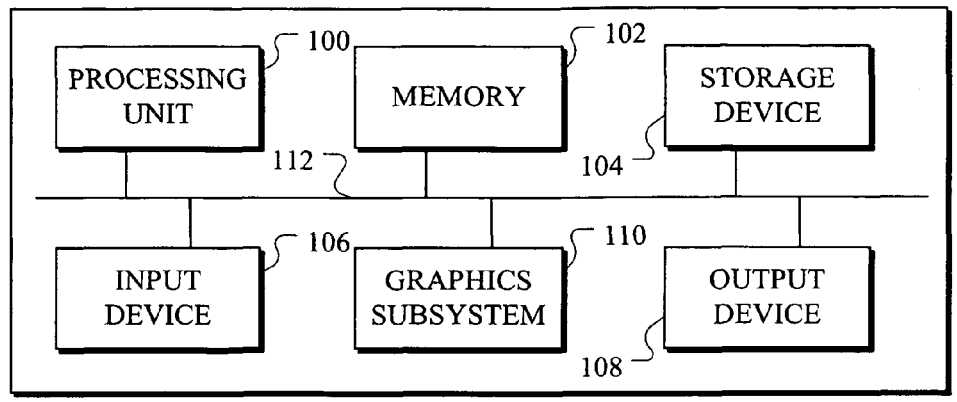
FIG. 1 shows an encoding/decoding apparatus according to an embodiment of the invention in a simplified block diagram.

The structure of an encoding/decoding apparatus according to a preferred embodiment of the invention will now be explained with reference to FIG. 1. The structure will be explained with functional blocks of the encoding arrangement. For a skilled man, it will be obvious that several functionalities can be carried out with a single physical device, e.g. all calculation procedures can be performed in a single processor, if desired. A data processing system of an encoding/decoding apparatus according to an example of FIG. 1 includes a processing unit 100, a memory 102, a storage device 104, an input device 106, an output device 108, and a graphics subsystem 110, which all are connected to each other via a data bus 112.

The processing unit 100 is a conventional processing unit such as the Intel Pentium processor, Sun SPARC processor, or AMD Athlon processor, for example. The processing unit 100 processes data within the data processing system. The memory 102, the storage device 104, the input device 106, and the output device 108 are conventional components as recognized by those skilled in the art. The memory 102 and storage device 104 store data within the data processing system 100. The input device 106 inputs data into the system while the output device 108 receives data from the data processing system. The data bus 112 is a conventional data bus and while shown as a single line it may be a combination of a processor bus, a PCI bus, a graphical bus, and an ISA bus. Accordingly, a skilled man readily recognized that the encoding/decoding apparatus may be any conventional data processing device, like a computer device or a wireless terminal of a communication system, the device including an image encoder system and/or an image decoder system according to embodiments to described further below.

Figure 2:
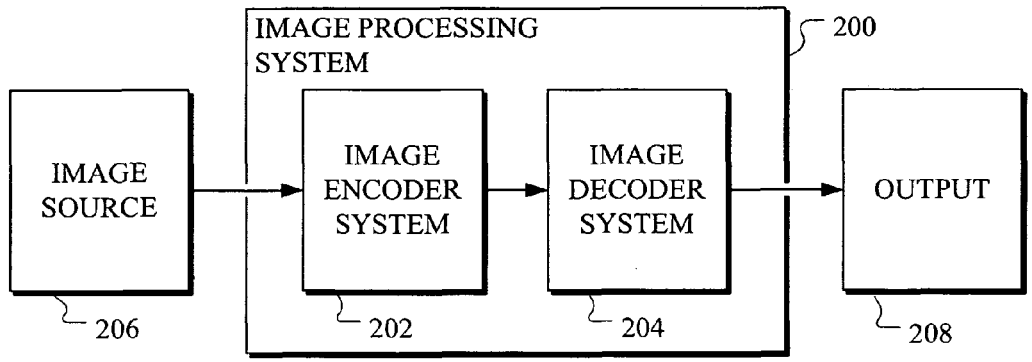
FIG. 2 shows an image processing system according to an embodiment in a simplified block diagram.

An image processing system 200 according to an embodiment is further illustrated in a block diagram of FIG. 2. The image processing system 200 includes an image encoder system 202 and an image decoder system 204. The image encoder system 202 is coupled to receive an image from an image source 206. The image decoder system 204 is coupled to an output 208, to which processed images are forwarded for storage or further processing. The image processing system 200 may be run within the data processing system of FIG. 1, whereby the image encoder system 202 is coupled to the image decoder system 204 through a data line and may be coupled via a storage device 104 and/or a memory 102, for example. The image processing system 200 can also be distributed in separate units, a first unit including the image encoder system 202 and a transmitter for sending the encoded images via a communication channel, and a second unit including the image decoder system 204 and a receiver for receiving the encoded images.

Within the image encoder system 202, the image is broken down into individual blocks and processed before being forwarded to, e.g., the storage device 104, as compressed or encoded image data. When the encoded image data is ready for further data processing, the encoded image data is forwarded to the image decoder system 204. The image decoder system 204 receives the encoded image data and decodes it to generate an output that is a representation of the original image that was received from the image source 206.

According to the prior art, the 16-bit floating-point representations for the color components of each pixel are conventionally encoded according to table 1.

TABLE 1

| Bit # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Data | sign | exponent | | | | | | mantissa | | | | | | | | |

Floating-point numbers are typically encoded based on the scientific notation of Table 1, wherein the highest bit is the sign, the next highest bits (e.g. 5 bits in the 16-bit format) represent the exponent, which is biased so that the smallest negative value maps to 0, and the lowest part of the bit-pattern (8-bit decimal part minus the leading one bit) is the mantissa. The 16-bit representation is created for each color component (RGB), yielding a practical bit rate of 48 bpp. Many contemporary graphics hardware also support the so-called "half-float" format having bit rate of the 64 bpp, wherein each pixel includes an alpha value determining the pixel's transparency.

Figure 3:
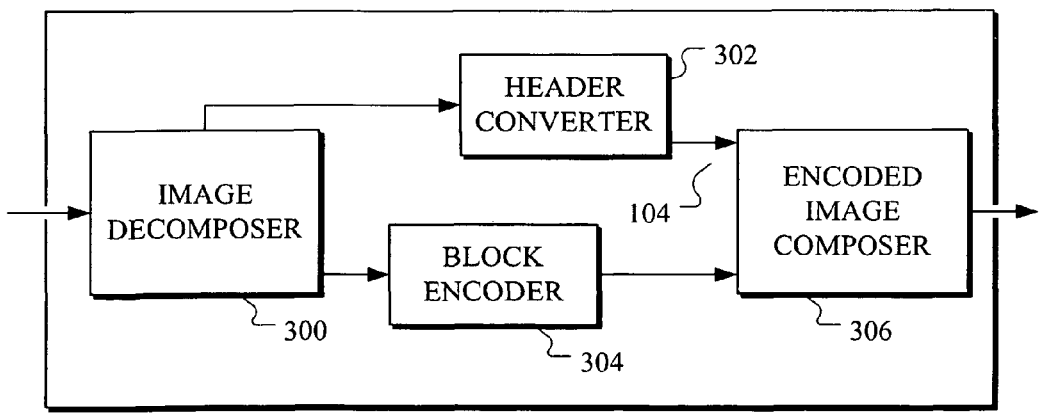
FIG. 3 shows an image encoder system according to an embodiment in a simplified block diagram.

An image encoder system 202 according to an embodiment is further illustrated in a block diagram of FIG. 3. The operation of the image encoder system 202 according to the embodiment stems from the 16-bit floating-point representation described above. The basic idea of the encoding includes dividing the HDR image into suitable blocks (e.g. 4×4 pixels), separating the color and intensity information from the floating-point format of the image data, and encoding the color and intensity information separately using lossy compression schemes. With such an encoding, the HDR images having bit rate of 48 bpp can be binary encoded into a practical bit rate of 8 bpp such that visual fidelity is maintained and random access for hardware implementations is possible.

Accordingly, the image encoder system includes an image decomposer 300, a header converter 302, one or more block encoders 304, and an encoded image composer 306. For the processing of an HDR image, the image decomposer 300 is coupled to receive an original HDR image from a source, such as the image source 206. The image decomposer 300 forwards information from a header of the original HDR image to the header converter 302, which modifies the original header to generate a modified header. Then the image decomposer 300 breaks, or decomposes, the original HDR image into N number of image blocks $IB_N$, where N is some integer value. Preferably, the image is decomposed such that each image block is 4 pixels by 4 pixels (16 pixels). A skilled man appreciates that the number of pixels or the image block size may be varied, for example m*n pixels, where m and n are positive integer values.

These image blocks are fed into the one or more block encoders 304, wherein each image block $IB_N$, preferably a 4×4 pixel block, is encoded independently to enable random access. To encode an image block, the intensity of each pixel of the image block is first computed as the sum of the red, green, and blue (RGB) components of the original data. According to an embodiment, the intensity may also be divided with an integer value to expand the numeric range, but this is made at the expense of precision in the lower end. The minimum intensity within the whole block, i.e. the pixel within the block having the smallest exponent, is then identified, and the floating-point exponent of the minimum intensity is stored in a table of compressed block data. The table preferably comprises a separate field for the minimum exponent value, which is referred herein as an "expBias" field.

Once the bias is determined, it is subtracted from the exponents of all intensity values within the image block. From the floating-point exponents, created as a result of this subtraction, the pixel within the block having the greatest value is then identified. Then the number of unnecessary zero bits in the greatest bit value is identified, i.e. the leading bits having bit value zero including the sign bit, the exponent bits and the mantissa bits. It should be noted that the number of unnecessary zero bits may vary, depending on the image block data, between 0 and 7. The number of unnecessary zero bits in the greatest bit value minus one (since the sign bit is always zero) is stored in the table of compressed block data. The field is referred herein as a "bitShift" field. Then said number of unnecessary zero bits is removed from the leading bits of each pixel within the image block.

According to an embodiment, the table of compressed block data contains fields for only 4 bits for the intensity information of each pixel of the image block. Therefore, it may not be possible to encode the original numeric range of the block in extreme cases. According to an embodiment, the encoder comprises predetermined settings for handling cases, wherein the image block data contains both very dark values and very bright values. Depending on the chosen approach, the encoder can then adjust the "expBias" value, which results in clipping the dark values, or clamp the exponent values to the maximum allowed, whereby the bright values are clipped.

To encode the de-biased pixel intensities, the lowest bits of the exponent field, and/or the highest bits of the mantissa field of each intensity value, altogether 4 bits, are stored in the intensity field for each pixel. It should be noted that in common floating-point bit layouts, the bits are adjacent in the original value, which advantageously enables to simplify both the encoding and the decoding.

The above-described process of encoding the intensity values of an image block is further elucidated by the following example wherein, for the sake of simplicity and perspicuity, the encoding is discussed in relation to only four pixels. Table 2 shows the 16-bit floating-point representations for the color components of said 4 pixels (P1-P4).

TABLE 2

| Data | Bit # | | | | | | | | | | | | | | | |
|---|---|---|---|---|---|---|---|---|---|---|---|---|---|---|---|---|
| | 15 sign | 14 | 13 | 12 | 11 | 10 | 9 | 8 | 7 | 6 | 5 | 4 | 3 | 2 | 1 | 0 |
| | | exponent | | | | | | | | | mantissa | | | | | |
| P1 | 0 | 0 | 0 | 1 | 0 | 1 | 1 | 0 | 0 | 1 | 0 | 1 | 0 | 1 | 0 | 1 |
| P2 | 0 | 0 | 0 | 0 | 1 | 1 | 0 | 0 | 1 | 1 | 1 | 0 | 0 | 0 | 1 | 0 |
| P3 | 0 | 0 | 0 | 0 | 1 | 1 | 0 | 0 | 1 | 0 | 0 | 0 | 1 | 1 | 0 | 1 |
| P4 | 0 | 0 | 0 | 0 | 1 | 0 | 0 | 1 | 1 | 0 | 0 | 0 | 1 | 1 | 1 | 0 |

The pixel P4 has the smallest exponent (00010); thus, it is stored in the "expBias" field of the compressed block data table and then subtracted from the rest of the exponents. Table 3 shows the floating-point exponents as a result of this subtraction.

TABLE 3

| Data | Bit # | | | | | | | | | | | | | | | |
|---|---|---|---|---|---|---|---|---|---|---|---|---|---|---|---|---|
| | 15 sign | 14 | 13 | 12 | 11 | 10 | 9 | 8 | 7 | 6 | 5 | 4 | 3 | 2 | 1 | 0 |
| | | exponent | | | | | | | | | mantissa | | | | | |
| P1 | 0 | 0 | 0 | 0 | 1 | 1 | 1 | 0 | 0 | 1 | 0 | 1 | 0 | 1 | 0 | 1 |
| P2 | 0 | 0 | 0 | 0 | 0 | 1 | 0 | 0 | 1 | 1 | 1 | 0 | 0 | 0 | 1 | 0 |
| P3 | 0 | 0 | 0 | 0 | 0 | 1 | 0 | 0 | 1 | 0 | 0 | 0 | 1 | 1 | 0 | 1 |
| P4 | 0 | 0 | 0 | 0 | 0 | 0 | 0 | 1 | 1 | 0 | 0 | 0 | 1 | 1 | 1 | 0 |

Now the pixel P1 has the greatest value and it has 4 unnecessary zero bits in its MSBs. Accordingly, the value of 3 (4−1=3) is stored in the "bitShift" field of the compressed block data table, and 4 unnecessary zero bits are removed from the MSBs of each pixel. Table 4 shows the results of this removal.

TABLE 4

| Data | Bit # | | | | | | | | | | | | | | | |
|---|---|---|---|---|---|---|---|---|---|---|---|---|---|---|---|---|
| | 15 sign | 14 | 13 | 12 | 11 | 10 | 9 | 8 | 7 | 6 | 5 | 4 | 3 | 2 | 1 | 0 |
| | | exponent | | | | | | | | | mantissa | | | | | |
| P1 | | | | | 1 | 1 | 1 | 0 | 0 | 1 | 0 | 1 | 0 | 1 | 0 | 1 |
| P2 | | | | | 0 | 1 | 0 | 0 | 1 | 1 | 1 | 0 | 0 | 0 | 1 | 0 |
| P3 | | | | | 0 | 1 | 0 | 0 | 1 | 0 | 0 | 0 | 1 | 1 | 0 | 1 |
| P4 | | | | | 0 | 0 | 0 | 1 | 1 | 0 | 0 | 0 | 1 | 1 | 1 | 0 |

From the remaining bits, 4 most significant bits for each pixel are stored in the compressed block data table as the intensity value. In this example, for each pixel two bits are derived from the exponent bits and two bits from the mantissa bits. The intensity bit values for pixel P1 are thus: (1,1,1,0), and the intensity bit values for the rest of the pixels are P2 (0,1,0,0), P3 (0,1,0,0) and P4 (0,0,0,1). A skilled man appreciates that, depending on the image block data, the number of unnecessary zero bits ("bitShift") may vary, whereby in some other case, all four bits could be derived from the exponent bits, or from the mantissa bits, respectively.

Consequently, the above procedures are carried out in order to efficiently encode the dynamics of the image data such that the high dynamic range of an HDR image is preserved, even though some accuracy is lost.

The compression efficiency is mainly achieved through color encoding. To encode the colors, each image block $IB_N$ (4×4 pixel block) is first divided into sub-blocks of 2×2 pixels, whereby each 4×4 image block $IB_N$ comprises 4 sub-blocks of 2×2 pixels. Then an average color for each 2×2 pixel sub-block is determined. The method, by which the average color is determined, is insignificant, and the average can be, for example, a straight average of the RGB values, an average weighted by the pixel intensities, or any other RGB color the encoder deems optimal for that sub-block.

Each average color is normalized by dividing with the sum of its R, G, and B components, resulting in normalized color coordinates r', g', and b'. Since the normalized coordinates sum up to 1, one of the normalized color coordinates r', g', and b' is redundant. Thereby, for example the g' coordinate may be left out, and only the r' and b' coordinates are encoded as 7-bit fixed point numbers for each 2×2 sub-block. These 7-bit fixed point numbers are stored in specific fields of the table of compressed block data. The fields are referred herein as "colorR" and "colorB" fields.

Accordingly, significant compression efficiency is obtained in color encoding through three steps: averaging the color value over a 2×2 pixel block instead of having color values for each pixel separately; normalizing the color coordinates, which enables to neglect one color coordinate in encoding; and encoding the remaining color coordinates only as 7-bit fixed point numbers. As a result of the whole encoding scheme, the image data of a 4×4 pixels image block will result in the table of compressed block data comprising 128 bits, yielding a bit rate of 8 bpp. The 128 bits in each compressed image block are allocated as shown in Table 5.

TABLE 5

| Field | Size in bits | Number per block | Description |
| --- | --- | --- | --- |
| expBias | 5 | 1 | minimum exponent value in the original data |
| bitShift | 3 | 1 | number of bits removed from FP exponent |
| colorR | 7 | 4 | r' color coordinate for each 2 × 2 pixel sub-block |
| colorB | 7 | 4 | b' color coordinate for each 2 × 2 pixel sub-block |
| intensity | 4 | 16 | 4 exponent/mantissa bits per pixel |

Naturally, the bit allocation described above is only one example of an appropriate encoding scheme, and a skilled man appreciates that also alternative bit allocations could be used. For example, if it is considered necessary to have more accurate intensity values, the number of intensity bit per pixel may be increased in the expense of color bits. Thereby, an alternative bit allocation having five intensity bits per pixel and only five color bits for both color coordinate per a 2×2 pixel sub-block could be used, for example. Table 6 shows the allocation of the 128 bits in this alternative scheme.

TABLE 6

| Field | Size in bits | Number per block | Description |
| --- | --- | --- | --- |
| expBias | 5 | 1 | minimum exponent value in the original data |
| bitShift | 3 | 1 | number of bits removed from FP exponent |
| colorR | 5 | 4 | r' color coordinate for each 2 × 2 pixel sub-block |
| colorB | 5 | 4 | b' color coordinate for each 2 × 2 pixel sub-block |
| intensity | 5 | 16 | 5 exponent/mantissa bits per pixel |

The encoded image blocks are then inserted in the encoded image composer 306, which arranges the encoded blocks in a data file, which is concatenated with the modified header from the header converter 302 to generate an encoded image data file. The modified header generated by the header converter 302 includes information about file type, a number of bits per pixel of the original image, addressing into the original image, other miscellaneous encoding parameters, as well as the width and height information indicating the size of that original image. The modified header and the encoded image blocks together form the encoded image data that represents the original image, however in a highly compressed format.

A skilled man appreciates that the encoding scheme described above can be implemented with some other image block and sub-block sizes than the disclosed 4×4 and 2×2 blocks. If larger block sizes are used, even greater compression efficiency can be achieved, but this naturally decreases the visual fidelity. If it is desirable to produce no or only little degradation of image quality, good results can be achieved by using the image block size of 4×4 pixels having sub-blocks of 2×2 pixels.

The advantages provided by the embodiments are apparent to a skilled person. A major advantage is that significant memory savings, in view of both storage capacity and the required bus bandwidth, are achieved in handling of the HDR textures. For example, a non-compressed HDR texture using the 16-bit OpenEXR image format has the practical bit rate of 48 bpp. The above-described procedure allows converting the bit rate into 8 bpp, yielding the memory savings of nearly 85% compared to the 16-bit OpenEXR non-compressed HDR textures. A further advantage is that the image quality of normal images, when decoded, degrades very little or even not at all. A yet further advantage is that embodiments can be implemented with only minor modifications to the existing hardware implementation.

Figure 4:
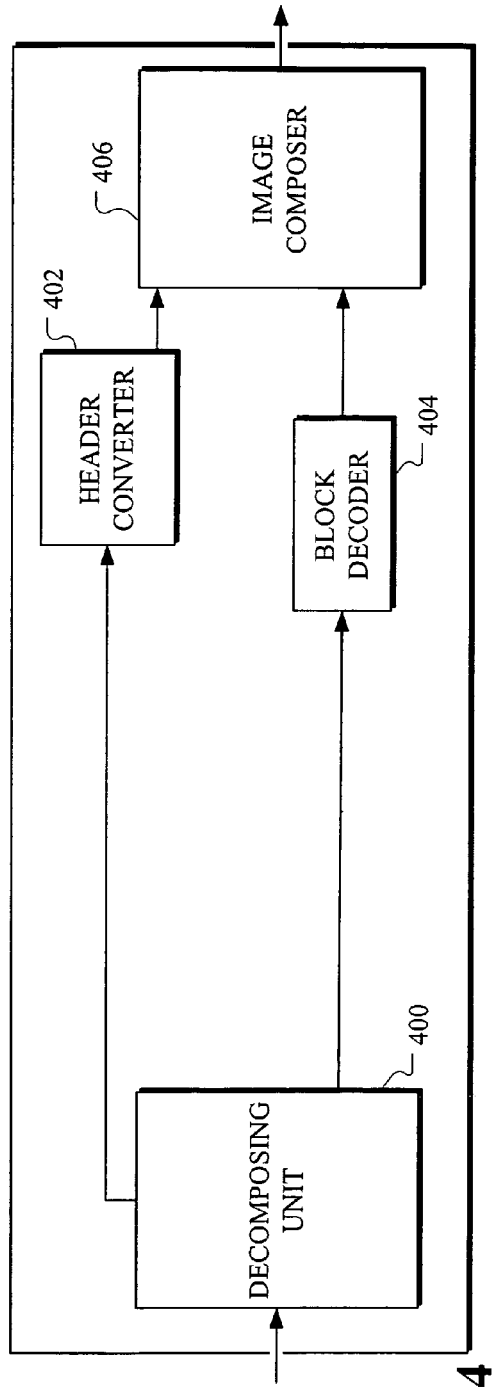
FIG. 4 shows an image decoder system according to an embodiment in a simplified block diagram.

An image decoder system 204 according to an embodiment is further illustrated in a block diagram of FIG. 4. The image decoder system 204 includes an encoded image decomposing unit 400, a header converter 402, one or more block decoders 404, and an image composer 406. The encoded image data is input to the decoder system 204. The encoded image decomposer 400 decomposes, or breaks, the encoded image data into its header and the encoded image blocks $IB_N$. The modified header is forwarded to the header converter 402. The individual encoded image blocks $IB_N$ are forwarded to the one or more block decoders 404 for decompression. Simultaneously, the header converter 402 converts the modified header to an output header.

The block decoders 404 start the decompression by decoding first the normalized color coordinates (r', g', b') for each 2×2 sub-block. In this process, the values of the respective "colorR" and "colorB" fields are used together with the information that g'=1−(r'+b'), whereby the lacking color component may be derived from the two encoded color components. Then the block decoders 404 decode the per-pixel intensity values by extracting the value of the "bitShift" field and the 4 bits from each intensity field containing exponent bits and/or mantissa bits. Then a number of zero bits, indicated by the value of the "bitShift" field plus 1 (sign bit as zero), are included in said 4 bits of each intensity field as most significant bits, after which the lacking least significant bits are set as zeros in order to create 16-bit representation. Subsequently, the minimum intensity exponent, stored in the "expBias" field, is added to each exponent. This results in a very good approximation of the original gray-scale intensity of each pixel.

The decoding process in relation to intensity values for each pixel can be illustrated by referring to the encoding example described above. In the example, the encoded intensity bit values for pixels were: P1 (1,1,1,0), P2 (0,1,0,0), P3 (0,1,0,0) and P4 (0,0,0,1). The value of the "bitShift" field was 3; thus, 3+1 results in 4 zero bits to be included in each intensity bit value as most significant bits and the lacking least significant bits are set as zeros. Table 7 shows the result of the procedure.

TABLE 7

| Data | Bit # | | | | | | | | | | | | | | | |
|---|---|---|---|---|---|---|---|---|---|---|---|---|---|---|---|---|
| | 15 sign | 14 | 13 | 12 | 11 | 10 | 9 | 8 | 7 | 6 | 5 | 4 | 3 | 2 | 1 | 0 |
| | | exponent | | | | | | | | | mantissa | | | | | |
| P1 | 0 | 0 | 0 | 0 | 1 | 1 | 1 | 0 | 0 | 0 | 0 | 0 | 0 | 0 | 0 | 0 |
| P2 | 0 | 0 | 0 | 0 | 0 | 1 | 0 | 0 | 0 | 0 | 0 | 0 | 0 | 0 | 0 | 0 |
| P3 | 0 | 0 | 0 | 0 | 0 | 1 | 0 | 0 | 0 | 0 | 0 | 0 | 0 | 0 | 0 | 0 |
| P4 | 0 | 0 | 0 | 0 | 0 | 0 | 0 | 1 | 0 | 0 | 0 | 0 | 0 | 0 | 0 | 0 |

Furthermore, in the example the value of the "expBias" field was 00010, which is added to each exponent field. Table 8 shows the result of the adding.

TABLE 8

| Data | Bit # | | | | | | | | | | | | | | | |
|---|---|---|---|---|---|---|---|---|---|---|---|---|---|---|---|---|
| | 15 sign | 14 | 13 | 12 | 11 | 10 | 9 | 8 | 7 | 6 | 5 | 4 | 3 | 2 | 1 | 0 |
| | | exponent | | | | | | | | | mantissa | | | | | |
| P1 | 0 | 0 | 0 | 1 | 0 | 1 | 1 | 0 | 0 | 0 | 0 | 0 | 0 | 0 | 0 | 0 |
| P2 | 0 | 0 | 0 | 0 | 1 | 1 | 0 | 0 | 0 | 0 | 0 | 0 | 0 | 0 | 0 | 0 |
| P3 | 0 | 0 | 0 | 0 | 1 | 1 | 0 | 0 | 0 | 0 | 0 | 0 | 0 | 0 | 0 | 0 |
| P4 | 0 | 0 | 0 | 0 | 1 | 0 | 0 | 1 | 0 | 0 | 0 | 0 | 0 | 0 | 0 | 0 |

Now, by comparing the results of the decoded intensity values for each pixel in Table 8 to the original 16-bit floating-point representations for the color components of each pixel in Table 2, it can be seen that the exponent fields are equal in both tables, as well as the two MSBs of the mantissa fields. Accordingly, it can be concluded that due to the nature of the floating-point arithmetic, the magnitude of the decoded intensity values for each pixel are is correct to a great extent, even though some minor details may be lost.

When the gray-scale intensity values of each pixel have been decoded, the gray-scale intensity of each pixel is modulated with the (r', g', b') color coordinates of the sub-block the pixel belongs to. As a result of the procedure, an RGB texture sample corresponding to a decoded image block $IB_N$ is obtained.

The decoded image blocks $IB_N$ are then inserted in the image composer 406, which rearranges them in a file. Further, the image composer 406 receives the converted header from the header converter 402, which is placed together with the decoded image blocks in order to generate output data representing the original HDR image data.

Thus, the decoding process can be implemented in a very straight-forward manner, which simplifies the hardware logic required for the decoding. The texturing hardware of the graphics subsystem advantageously interprets the image data as if it had been read from a floating-point texture directly. A skilled man readily recognizes that the image data compression process described above causes some details from the original HDR image to be lost, but this happens in all lossy compression schemes. Moreover, due to the nature of the floating-point arithmetic used in HDR data, the large values usually dominate over small details in typical applications. In consequence, the loss of detail caused by the bias-adjusted dynamics and the averaging color encoding is not necessarily very apparent.

Figure 5:
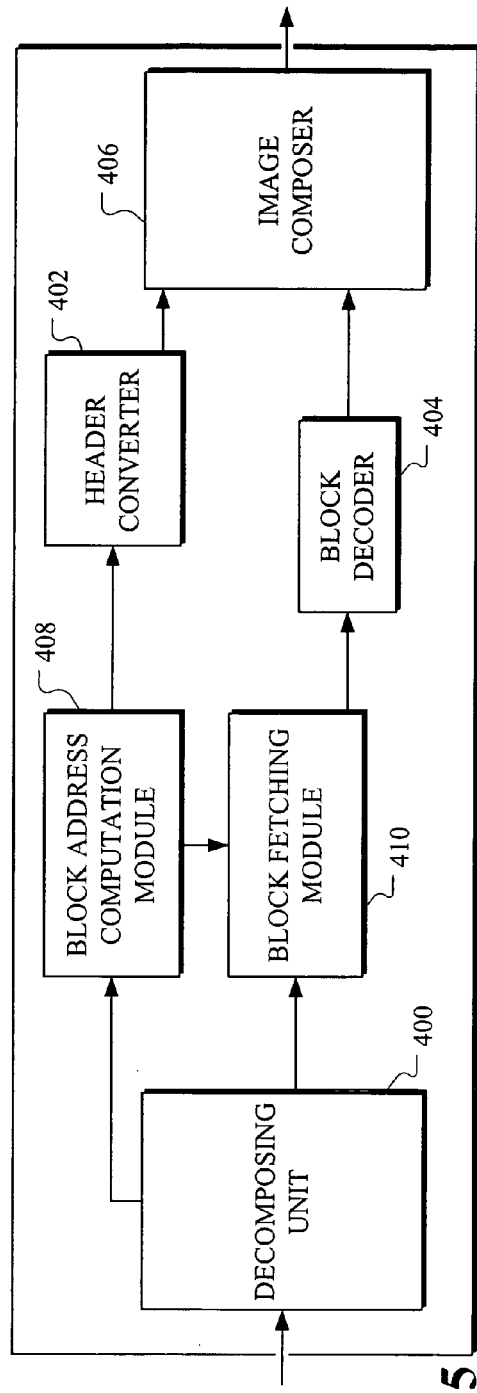
FIG. 5 shows a random access subsystem of an image decoder according to an embodiment in a simplified block diagram.

It should be noted that the decoding may be carried out either a block at a time into a texture cache, or one pixel at a time in which case only a subset of the block data needs to be accessed per pixel. Thus, according to an embodiment, the image decoder system 204 further includes a subsystem that provides random access to any desired pixel or image block within an image. The random access subsystem, shown in FIG. 5, is implemented in the image decoder system of FIG. 4, and it includes a block address computation module 408, and a block fetching module 410, which is connected to the one or more block decoders 404. The block address computation module 408 receives header information of the encoded image data from the encoded image decomposer 400. The block fetching module 410 receives an encoded image block portion of the encoded image data.

A process of random access to one or more pixels within an image typically starts by identifying the particular pixels to be decoded. When the image decoder system receives the encoded image data, the modified header of the encoded image data is forwarded to the block address computation module 408 and the encoded image block portion of the encoded image data is forwarded to the block fetching module 410. The block address computation module 408 deduces the address (i.e. the pixel coordinates) of the encoded image block portion including the desired pixels, and the block fetching module 410 identifies, based on the address, the encoded image block including the desired pixels. Then only the identified encoded image block is forwarded to the block decoders 404 for decoding. Again, the, block decoders 404 decode the normalized color coordinates (r', g', b') for each 2×2 sub-block, after which the per-pixel intensity values are decoded by extracting the value of the "bitShift" field and the 4 bits from each intensity field. The required number of zero bits is included in said 4 bits of each intensity field as most significant bits, and the minimum intensity exponent, stored in the "expBias" field, is added to each exponent. Finally, the gray-scale intensity of each pixel is modulated with the corresponding sub-block (r', g', b') color coordinates, whereby RGB texture samples with a high dynamic range are achieved for each image block $IB_N$. Then the colors of the desired pixels are selected according to the pixel values and the desired pixels are output from the image decoder system.

According to an embodiment, the image decoder system includes a buffer memory, i.e. a texture cache, wherein the most frequently used encoded image blocks can be temporarily stored, and the random access process can be applied only to the desired pixels of the stored image blocks. In other words, the whole encoded image data does not need to be inserted into the decomposing unit 400, but only the desired encoded image blocks can be retrieved from the texture cache.

Consequently, since any pixels of any image block can be accessed randomly, only needed sections of an image can beneficially be selected for decoding. Random access also allows different sections of the image to be decoded in any desired order, which is preferable, for example, in three-dimensional texture mapping wherein only some portions of the texture may be required and these portions may further be required in some non-sequential order.

The steps according to the embodiments can be largely implemented with program commands to be executed in the processing unit of a data processing device operating as an encoding and/or decoding apparatus. Thus, said means for carrying out the method described above can be implemented as computer software code, even though a hardware solution at least in the decoder may be more preferable. The computer software may be stored into any memory means, such as the hard disk of a PC or a CD-ROM disc, from where it can be loaded into the memory of the data processing device. The computer software can also be loaded through a network, for instance using a TCP/IP protocol stack. It is also possible to use a combination of hardware and software solutions for implementing the inventive means.

It is obvious that the present invention is not limited solely to the above-presented embodiments, but it can be modified within the scope of the appended claims.

The invention claimed is:

1. A method for encoding an image having color components of each image pixel represented by a value of a high dynamic range, the method comprising:
    decomposing the image into a plurality of image blocks;
    separating, from the high dynamic range value of each pixel, color information and intensity information of the pixels in said image blocks;
    identifying a minimum intensity within said image blocks;
    storing a floating-point exponent of the minimum intensity in a table of compressed block data as a bias value;
    subtracting the bias value from the exponents of all intensity values within the image block to provide biased intensity values for each pixel;
    storing the number of leading zero bits of the floating-point bit pattern of the largest biased intensity value in the table of compressed block data, whereby a sign bit is ignored from the number of leading zero bits;
    compressing the intensity information of the pixels separately for each pixel in said image blocks; and
    compressing the color information of the pixels in said image blocks independently of the intensity information of the pixels in said image blocks using lossy compression schemes to provide compressed image data.

2. The method according to claim 1, the method further comprising:
    removing from leading zero bits of the floating-point bit patterns of the biased intensity values of each pixel the number of leading zero bits of the floating-point bit pattern of the largest biased intensity value; and
    storing a fixed number of leading bits from the resulting floating-point bit patterns of the biased intensity values of each pixel in the table of compressed block data.

3. The method according to claim 1, the method further comprising:
    dividing the image data in said image blocks into sub-blocks;
    averaging the color information of the pixels in said sub-blocks such that each pixel in said sub-block is determined to have the same averaged color value.

4. The method according to claim 3, the method further comprising:
    normalizing the averaged color information by dividing it with the sum of its color components, and
    leaving one of the normalized color components out of the compression process.

5. The method according to claim 4, the method further comprising:
    encoding the remaining color components as 7-bit fixed point numbers.

6. The method according to claim 1, wherein the size of the image block is 4×4 pixels.

7. The method according to claim 3, wherein the size of the sub-block is 2×2 pixels.

8. A method for decoding an image from encoded image data, the method comprising:
    decomposing the encoded image data into a plurality of encoded image blocks;
    decoding an averaged color information of pixels in a sub-block of said image blocks;
    decoding intensity information of the pixels in said image blocks by decoding a fixed number of intensity value bits for each pixel, decoding a number of leading zero bits to be included in the intensity value bits for each pixel, and decoding a bias value, which is added to the intensity value bits for each pixel;
    modulating the intensity information of each pixel with the averaged color information of the corresponding pixel; and
    composing the decoded image blocks into an image with the original dynamic range.

9. The method according to claim 8, the method further comprising:
    representing the original dynamic range values of the color components of the pixels with 16-bit or 32-bit floating point arithmetic.

10. The method according to claim 8, wherein for decoding any pixel of the encoded image data, the method further comprising:
    identifying at least one pixel to be decoded;
    determining, after decomposing the encoded image data into the image blocks, an address of the at least one image block including the at least one pixel to be decoded;
    retrieving only the at least one image block including the at least one pixel for decoding; and
    decoding the image data of said at least one image block to output decoded image data of said at least one pixel.

11. Apparatus comprising:
    at least one processor; and
    at least one memory including computer software code,
    said at least one memory and the computer software code configured to, with the at least one processor, cause the apparatus at least to:
    receive an image having color components of each image pixel represented by a value of a high dynamic range and decompose the image into a plurality of image blocks;
    separate from the high dynamic range value of each pixel, color information and intensity information of the pixels in said image blocks, identify a minimum intensity within said image blocks;
store a floating-point exponent of the minimum intensity in a table of compressed block data as a bias value;
subtract the bias value from the exponents of all intensity values within the image block to provide biased intensity values for each pixel;
store the number of leading zero bits of the floating-point bit pattern of the largest biased intensity value in the table of compressed block data, whereby a sign bit is ignored from the number of leading zero bits;
compress the intensity information of the pixels separately for each pixel in said image blocks;
compress the color information of the pixels in said image blocks independently of the intensity information of the pixels in said image blocks using lossy compression schemes to provide compressed image data; and
compose an encoded image file from the compressed image data of said plurality of encoded image blocks.

12. The apparatus according to claim 11, wherein said at least one memory and the computer software code are configured to, with the at least one processor, cause the apparatus at least to
remove from leading zero bits of the floating-point bit patterns of the biased intensity values of each pixel the number of leading zero bits of the floating-point bit pattern of the largest biased intensity value; and
store a fixed number of leading bits from the resulting floating-point bit patterns of the biased intensity values of each pixel in the table of compressed block data.

13. The apparatus according to claim 11, wherein said at least one memory and the computer software code are configured to, with the at least one processor, cause the apparatus at least to
divide the image data in said image blocks into sub-blocks;
average the color information of the pixels in said sub-blocks such that each pixel in said sub-block is determined to have the same averaged color value.

14. The apparatus according to claim 13, wherein said at least one memory and the computer software code are configured to with the at least one processor, cause the apparatus at least to
normalize the averaged color information by dividing it with the sum of its color components, and
leave one of the normalized color components out of the compression process.

15. The apparatus according to claim 14, wherein said at least one memory and the computer software code are configured to, with the at least one processor, cause the apparatus at least to
encode the remaining color components as 7-bit fixed point numbers.

16. The apparatus according to claim 11, wherein the size of the image block is 4×4 pixels.

17. The apparatus according to claim 11, wherein the size of the sub-block is 2×2 pixels.

18. Apparatus, comprising:
at least one processor; and
at least one memory including computer software code,
said at least one memory and the computer software code configured to, with the at least one processor, cause the apparatus at least to:
receive an encoded image data;
decompose the encoded image data into a plurality of encoded image blocks;
decode an averaged color information of pixels in a sub-block of said image blocks;
decode intensity information of the pixels in said image blocks by decoding a fixed number of intensity value bits for each pixel;
decode a number of leading zero bits to be included in the intensity value bits for each pixel, and
decode a bias value and add said bias value to the intensity value bits for each pixel;
modulate the intensity information of each pixel with the averaged color information of the corresponding pixel; and
compose the decoded image blocks into an image with the original dynamic range.

19. The apparatus according to claim 18, at least one memory and the computer software code are configured to, with the at least one processor, cause the apparatus to:
represent the original dynamic range values of the color components of the pixels with 16-bit or 32-bit floating point arithmetic.

20. The apparatus according to claim 18, at least one memory and the computer software code are configured to, with the at least one processor, cause the apparatus to:
identify at least one pixel to be decoded;
determine, after decomposing the encoded image data into the image blocks, an address of the at least one image block including the at least one pixel to be decoded;
retrieve only the at least one image block including the at least one pixel for decoding; and
decode the image data of said at least one image block to output decoded image data of said at least one pixel.

21. An image processing device for encoding an image having color components of each image pixel represented by a value of a high dynamic range, the device including an image encoder comprising:
an image decomposer for receiving image data of said image and for decomposing the image into a plurality of image blocks;
at least one block encoder for separating, from the high dynamic range value of each pixel, color information and intensity information of the pixels in said image blocks, said at least one block encoder configured to
identify a minimum intensity within said image blocks;
store a floating-point exponent of the minimum intensity in a table of compressed block data as a bias value;
subtract the bias value from the exponents of all intensity values within the image block to provide biased intensity values for each pixel;
store the number of leading zero bits of the floating-point bit pattern of the largest biased intensity value in the table of compressed block data, whereby a sign bit is ignored from the number of leading zero bits;
compress the intensity information of the pixels separately for each pixel in said image blocks; and
compress the color information of the pixels in said image blocks independently of the intensity information of the pixels in said image blocks using lossy compression schemes to provide compressed image data; and
an encoded image composer for composing an encoded image file from the compressed image data of said plurality of encoded image blocks.

22. An image processing device for decoding an encoded image data, the device including an image decoder comprising:
an image decomposer for receiving an encoded image data and for decomposing the encoded image data into a plurality of encoded image blocks;
at least one block decoder for decoding an averaged color information of pixels in a sub-block of said image blocks; for decoding intensity information of the pixels in said image blocks by decoding a fixed number of intensity value bits for each pixel, decoding a number of leading zero bits to be included in the intensity value bits for each pixel, and decoding a bias value and add said bias value to the intensity value bits for each pixel; and for modulating the intensity information of each pixel with the averaged color information of the corresponding pixel; and an image composer for composing the decoded image blocks into an image with the original dynamic range.

23. A non-transitory computer readable medium comprising a computer program stored thereon the computer program executable in a data processing device, for encoding an image having color components of each image pixel represented by a value of a high dynamic range, the computer program comprising:

a computer program code section for receiving image data of said image and for decomposing the image into a plurality of image blocks;

a computer program code section for separating, from the high dynamic range value of each pixel, color information and intensity information of the pixels in said image blocks;

a computer program code section for identifying a minimum intensity within said image blocks;

a computer program code section for storing a floating-point exponent of the minimum intensity in a table of compressed block data as a bias value;

a computer program code section for subtracting the bias value from the exponents of all intensity values within the image block to provide biased intensity values for each pixel;

a computer program code section for storing the number of leading zero bits of the floating-point bit pattern of the largest biased intensity value in the table of compressed block data, whereby a sign bit is ignored from the number of leading zero bits;

a computer program code section for compressing the intensity information of the pixels separately for each pixel in said image blocks;

a computer program code section for compressing the color information of the pixels in said image blocks independently of the intensity information of the pixels in said image blocks to provide compressed image data; and a computer program code section for composing an encoded image file from the compressed image data of said plurality of encoded image blocks.

24. A non-transitory computer readable medium comprising a computer program stored thereon, the computer program executable in a data processing device, for decoding an encoded image data, the computer program product comprising:

a computer program code section for decomposing the encoded image data into a plurality of encoded image blocks;

a computer program code section for decoding an averaged color information of pixels in a sub-block of said image blocks;

a computer program code section for decoding intensity information of the pixels in said image blocks by decoding a fixed number of intensity value bits for each pixel, decoding a number of leading zero bits to be included in the intensity value bits for each pixel, and decoding a bias value and add said bias value to the intensity value bits for each pixel;

a computer program code section for modulating the intensity information of each pixel with the averaged color information of the corresponding pixel; and a computer program code section for composing the decoded image blocks into an image with the original dynamic range.

* * * * *